United States Patent
Gkoulalas-Divanis et al.

(10) Patent No.: US 9,268,950 B2
(45) Date of Patent: Feb. 23, 2016

(54) CONCEALING SENSITIVE PATTERNS FROM LINKED DATA GRAPHS

(71) Applicant: INTERNATIONAL BUSINESS MACHINES CORPORATION, Armonk, NY (US)

(72) Inventors: Aris Gkoulalas-Divanis, Dublin (IE); Spyros Kotoulas, Dublin (IE); Vanessa Lopez Garcia, Dublin (IE); Marco Luca Sbodio, Dublin (IE)

(73) Assignee: International Business Machines Corporation, Armonk, NY (US)

(*) Notice: Subject to any disclaimer, the term of this patent is extended or adjusted under 35 U.S.C. 154(b) by 59 days.

(21) Appl. No.: 14/143,923

(22) Filed: Dec. 30, 2013

(65) Prior Publication Data

US 2015/0186653 A1 Jul. 2, 2015

(51) Int. Cl.
*G06F 21/60* (2013.01)
*G06F 17/30* (2006.01)

(52) U.S. Cl.
CPC .......... *G06F 21/60* (2013.01); *G06F 17/30371* (2013.01)

(58) Field of Classification Search
CPC combination set(s) only.
See application file for complete search history.

(56) References Cited

U.S. PATENT DOCUMENTS

| | | | |
|---|---|---|---|
| 7,472,105 B2 | 12/2008 | Staddon et al. | |
| 7,512,612 B1 * | 3/2009 | Akella et al. | |
| 8,346,774 B1 * | 1/2013 | Kanevsky et al. | 707/737 |
| 8,352,403 B2 | 1/2013 | Lee et al. | |
| 8,369,565 B2 | 2/2013 | Shu et al. | |
| 2003/0084339 A1 | 5/2003 | Roginsky et al. | |
| 2009/0144255 A1 | 6/2009 | Chow et al. | |
| 2009/0303237 A1 * | 12/2009 | Liu et al. | 345/440 |
| 2010/0268719 A1 * | 10/2010 | Cormode et al. | 707/756 |
| 2012/0297462 A1 | 11/2012 | Peckover | |
| 2013/0124452 A1 | 5/2013 | Arkoudas et al. | |
| 2013/0268357 A1 | 10/2013 | Heath | |

FOREIGN PATENT DOCUMENTS

| | | |
|---|---|---|
| WO | WO 2010/011747 A1 | 1/2010 |
| WO | WO 2013/007525 A1 | 1/2013 |

OTHER PUBLICATIONS

Aron, "Information Privacy for Linked Data", Massachusetts Institute of Technology, Thesis Submitted to the Department of Electrical Engineering and Computer Science, Dec. 28, 2012, pp. 1-70.
Gkoulalas-Divanis et al., "Revisiting Sequential Pattern Hiding to Enhance Utility," KDD'11, Aug. 21-24, 2011, San Diego, California.

(Continued)

*Primary Examiner* — Beemnet Dada
(74) *Attorney, Agent, or Firm* — Scully, Scott, Murphy & Presser, P.C.; Jeff Tang, Esq.

(57) ABSTRACT

A method, system and computer program product for preventing sensitive pattern disclosures from Linked Data graphs. The proposed method (i) receives as input a Linked Data graph and a set of query patterns that correspond to sensitive knowledge that needs to be concealed, and (b) minimally distorts the Linked Data graph to generate a sanitized counterpart (graph) in which only the non-sensitive patterns can be discovered. The method supports a variety of utility functions, which it optimizes during the graph sanitization process. The resulting, sanitized graph can be subsequently used for publishing and/or querying purposes.

20 Claims, 8 Drawing Sheets

(56) References Cited

OTHER PUBLICATIONS

Gkoulalas-Divanis et al., "Association Rule Hiding for Data Mining—Monograph," Springer, Jan. 2010, book, pp. 1- 170.

Zhou et al., "A Brief Survey on Anonymization Techniques for Privacy Preserving Publishing of Social Network Data,", http://www.time.com/time/magazine/article/0,917,1651513,00.html, Aug. 20, 2007.

Lu et al., "An Inference Control Algorithm for RDF(S) Repository," Proceedings Series: Intelligence and Secutiry Informatics, Pacific Asia Workshop, PAISI 2007, Chengdu, China, Apr. 11-12, 2007.

Natwichai et al., "A Reconstruction-based Algorithm for Classification Rules Hiding," Australian Computer Society, Inc., 17th Australasian Database Conference (ADC2006), Hobart, Australia, Conferences in Research and Practice in Information Technology (CRPIT), vol. 49, Jan. 16-19, 2006.

O'Leary, "Knowledge Discovery as a Threat to Database Security," from The MIT Press Classics Series and AAAI Press: Knowledge Discovery in Databases, Edited by Gregory Piatetsky-Shapiro and William J. Frawley, Dec. 1991.

Oulmakhzoune et al., "Privacy policy preferences enforced by SPARQL Query Rewriting", 2012 Seventh International Conference on Reliability and Security (ARES), Aug. 20-24, 2012, pp. 335-342.

Parmar et al., "Blocking based approach for classification Rule hiding to Preserve the Privacy in Database", 2011 International Symposium on Computer Science and Society (ISCCS), Jul. 16-17, 2011, pp. 323-326.

Zheleva et al., "Preserving the Privacy of Sensitive Relationships in Graph Data", Proceeding PinKDD'07 Proceedings of the 1st ACM SIGKDD International Conference on Privacy, security, and trust in KDD, Aug. 12, 2007, pp. 153-171.

International Search Report dated Nov. 18, 2014, issued in International Application No. PCT/US14/52799.

* cited by examiner

Subgraph of all persons who did a LabTest, with the respective LabTest results: — 210

PREFIX soc:
<http://www.ibm.com/healthcare/social_context#>
construct {
 ?x soc:hasLaTest ?t .
 ?t ?p ?n .
} — 220
where {
 ?x soc:samePerson ?y .
 ?y soc:hasLabTest ?t .
 ?t ?p ?n .
} — 222

1147 nodes <-> RDF resources
8882 edges <-> RDF properties — 230

CONCEALING SENSITIVE PATTERNS FROM LINKED DATA GRAPHS

FIELD

The present disclosure generally relates to systems and methods that protect privacy of data, and particularly a system and method to effectively conceal sensitive patterns from Linked Data graph structures.

BACKGROUND

Linked Data is increasingly used in the Web, both by governmental and business organizations. Linked Data is a way to publish data using standard Web technologies (HTTP and URI), and to leverage the expressiveness of the Semantic Web (Linked Data is encoded using Resource Description Framework (RDF), commonly used to describe Linked Data graphs). A Linked Data graph G is published (using RDF) as web data and is accessible via a browser.

The key differentiating strengths of Linked Data are (1) the well-defined semantics allowing automated reasoning (ability to infer new data from existing one), and (2) the implicitly interlinked nature of the information.

In the Linked Data world, data is represented by entities with formally defined semantics: each entity has a set of properties, and a property can connect two entities or an entity to a value of a defined data type. The resulting underlying data structure is a directed labeled graph, where nodes represent entities, and edges represent properties. Entities and properties are typically uniquely identified by Uniform Resource Identifiers (URIs).

URIs can be dereferenced. Dereferencing consists essentially of an HTTP GET operation, which retrieves additional information about the data (entity or property) identified by the URI being dereferenced.

Well-defined semantics and URI dereferenceability makes Linked Data graphs unique with respect to traditional relational data and graph data. These two characteristic aspects of Linked Data makes it possible for a software program to automatically augment a given Linked Data graph with new information, either by inferring it from the semantics of the graph (through inference) or by retrieving it from the Web (by dereferencing URIs). In such a scenario, it is particularly challenging to guarantee privacy-protection of potentially sensitive information published as a Linked Data graph.

Existing privacy-protection techniques, for example techniques for offering anonymity, work well either on relational data or graph structures (including social network graphs). Further, privacy techniques to conceal sensitive patterns have been proposed in the context of frequent item sets, association rules, and classification rules. None of these techniques is applicable in the context of Linked Data graphs.

As linked data offers a powerful representation for data; together with semantic technologies, it facilitates the easy management, interconnection and consumption (analysis) of large-scale data from distributed sources.

However, this data can come from domains with significant privacy concerns, such as healthcare, social care and public safety. In addition, this data can often be included as context in existing systems, or be published as open data.

In any case, Linked Data are highly vulnerable to sensitive pattern disclosure attacks, i.e., sensitive inferences that can be drawn when querying Linked Data graphs.

BRIEF SUMMARY

There is provided a system, method and computer program product for concealing sensitive patterns in Linked Data graphs.

The system, method and computer program product ensures preventing sensitive pattern disclosures that could be otherwise drawn from Linked Data graphs, while allowing querying of Linked Data graphs from which only the non-sensitive patterns can be discovered.

Thus, in one embodiment, there is provided a method to conceal sensitive patterns from Linked Data graphs. The method comprises: receiving at a hardware processor, data representing a Linked Data graph form (data graph G) and a set of patterns to be concealed in said data graph G; identifying one or more bindings in graph G which lead to the discovery of the patterns; and removing each of the one or more bindings in the data graph G to form a new data graph G' such that the patterns discoverable in G, cannot be discovered in graph G', said hardware processor configured to perform said identifying and binding removing in said data graph.

In one embodiment, the bindings are removed in a manner to optimize a utility function F.

In a further embodiment, there is provided a system for concealing sensitive patterns from Linked Data graphs. The system comprises: a memory storage device; a hardware processor programmed with instructions from said memory storage device to configure said hardware processor to: receive data representing a Linked Data graph form (data graph G); receive data representing a set of patterns to be concealed in said data graph G; identify one or more bindings in data graph G which lead to the discovery of the patterns; and remove the one or more bindings in the data graph G to form a new data graph G' such that said patterns discoverable in G, cannot be discovered in graph G'.

A computer program product is provided for performing operations. The computer program product includes a storage medium readable by a processing circuit and storing instructions run by the processing circuit for running a method. The storage medium readable by a processing circuit is not only a propagating signal. The method is the same as listed above.

BRIEF DESCRIPTION OF THE SEVERAL VIEWS OF THE DRAWINGS

The objects, features and advantages of the present invention will become apparent to one of ordinary skill in the art, in view of the following detailed description taken in combination with the attached drawings, in which:

FIG. 3A depicts an example application and results of applying a query to a dataset in a particular domain.

DETAILED DESCRIPTION

Linked Data is a popular way of publishing data on the Web. In Linked Data, entities are uniquely identified with HTTP URIs (unique resource identifiers), so users can look up those names in the Web (simply by dereferencing the URI over the HTTP protocol). Entities are linked to other entities through relationships. Therefore, Linked Data can be seen as a directed labeled graph-based data model, which encodes data in the form of subject, predicate, object triples. The predicate (or property) specifies how the subject and object entities (or resources) are related, and is also represented by a URI. A common serialization format for Linked Data is RDF/XML. The Resource Description Framework (RDF) is a standard model that enables Web publishers to make these links explicit, and in such a way that RDF-aware applications can follow them to discover more data. Linked Data practices have been adopted by an increasing number of data providers, resulting in the creation of a global data space on the Web including billions of RDF triples. Thus, Linked Data provides a novel and important scenario to apply privacy and anonymization techniques.

The present disclosure provides a system, method and computer program product for preventing sensitive pattern disclosures that could be otherwise drawn from Linked Data graphs. The system, method and computer program product allows querying of Linked Data graphs, from which only the non-sensitive patterns can be discovered, while the sensitive patterns are effectively concealed.

Figure 1:
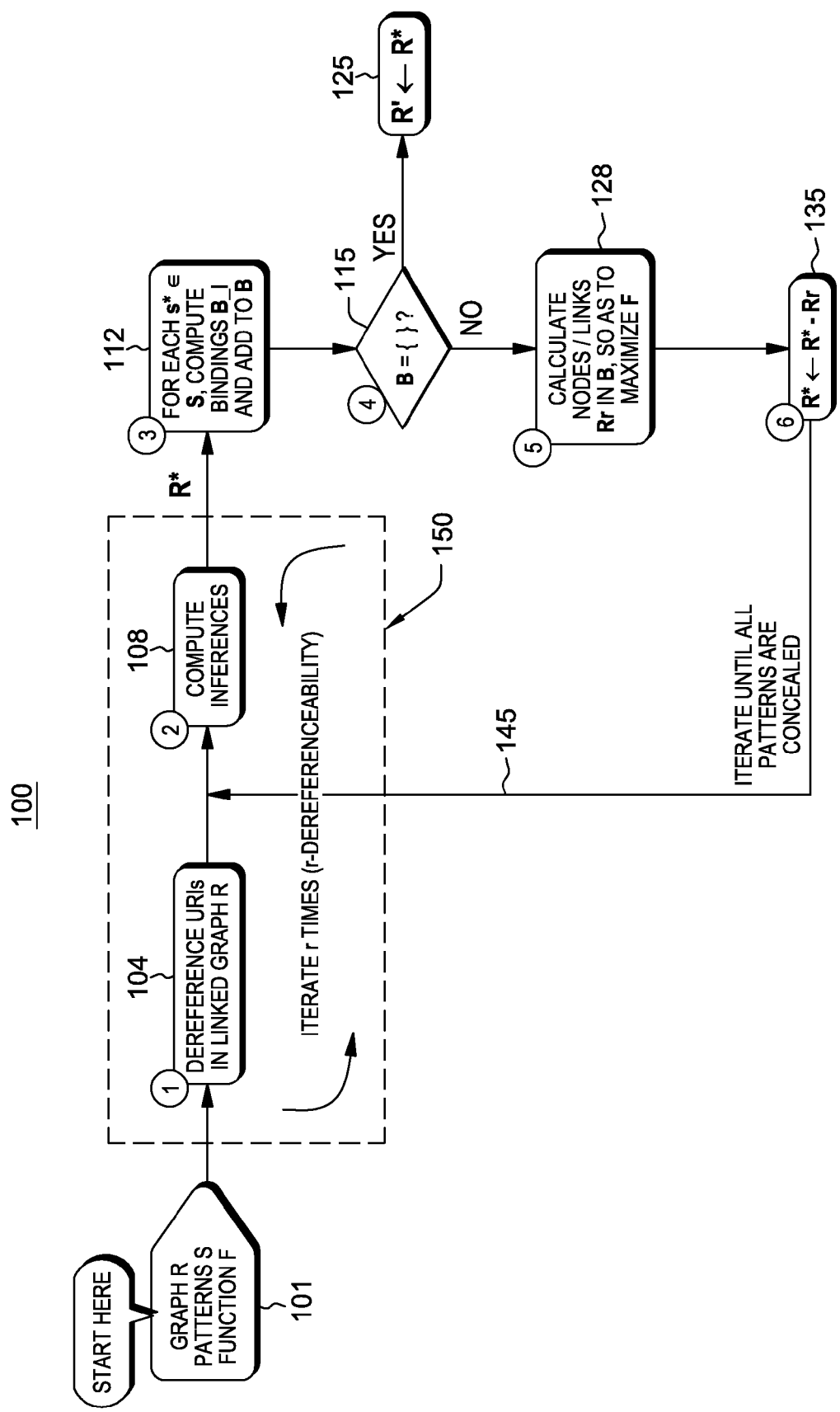
FIG. 1 illustrates a computer-implemented method for automatically transforming an original RDF graph to preserve its intended utility while avoiding the ability for users to extract sensitive patterns in one embodiment.

FIG. 1 shows a method 100 for concealing sensitive patterns in Linked Data graphs encoded as RDFs. At 101, FIG. 1 there is represented the step of inputting the data used for detecting and concealing the sensitive patterns in the Linked Data graphs. The data input includes the data of a Linked Data graph, e.g., Linked Data graph R, and, a set of query patterns S, whose results that are considered as sensitive by the data owner. In one implementation, the set of query patterns S are SPARQL queries normally used for querying RDF linked data graph structures.

In an alternate embodiment, a user-defined function F of utility that needs to be maintained in the graph may be optionally specified as input.

A second step comprises two steps that may be executed iteratively. A first step 104 is a step to dereference the URI's in the Linked Data graph R. This is performed to expand the graph edges and nodes with additional linked information. Then, at 108, a well-known RDF "materialization" step is performed to compute inferences based on the expanded graph nodes. As known, "materialization" is a process through which a RDF can be processed to extract indirect inferences from a Linked Data graph with existing tools, i.e., both direct and indirect inferences can be extracted and sensitive information from the graph may be obtained or discovered. Original RDF graph "triples" are used through the materialization process to draw indirect inferences in Linked Data graphs, and generate new (derived) triples. A triple is a data structure including: a subject and an object which can be mapped to nodes, and a predicate, which is a graph edge connecting the nodes in the graph.

At step 104, the dereferencing of URIs in graph R expands the graph to bring in more information that could lead to discoverable sensitive patterns. The computer system computes and extracts the inferences in the expanded graph at 108, i.e., sensitive patterns that could be extracted from the graph. The more information that is brought in from the graph dereferencing, the more patterns could be revealed. In one embodiment, this process is repeated for r times where r is an expansion threshold (limit) for which the method guarantees that the expansion would not lead to unanticipated connections. The URIs could be expanded many times, but an implementation will depend on the sensitivity of the information of such far reaching dereferences.

After expanding the original input graph R and obtaining inferences iteratively, up to r times, results in the expanded RDF graph R*.

Then, at 112, FIG. 1 the following sanitization process is performed on the expanded RDF graph R*: for each s*∈S, where s* are query patterns (queries) from the original graph whose answer sets are to be concealed, e.g., due to privacy concerns of a data owner, or are specified or considered as sensitive by the data owner, identifying different ways (i.e., paths in the graph), called bindings $B_i$, in which the answers to s* can be generated from R*. Bindings are paths in the RDF R* that lead to generation of the sensitive pattern and these need to be eliminated. That is, the queries s* correspond to and are based on answers corresponding to the user specified sensitive patterns. At step 112 the method computes the bindings corresponding to the sensitive answers (patterns) obtainable by the queries s* corresponding to and/or based on the user specified sensitive patterns and are then removed. Breaching a path (binding) in graph R* can be achieved in multiple ways, i.e., by removing selected node(s) and or edge(s) from the path. Different transformations (nodes/edges deletions) have a different effect on data utility as they may affect other (potentially non-sensitive) patterns that are discoverable from the graph. In one embodiment, the computed bindings $B_i$ of the corresponding pattern i are intended to maximize the optionally specified utility function F. For example, if the purpose of releasing the sanitized Linked Data graph is to enable the data recipients to discover the most non-sensitive patterns, then the transformation has to ensure that the deleted nodes/edges do not breach other paths (bindings) in the graph that would allow the discovery of a non-sensitive pattern. As another example, if data owner wishes to preserve the incoming/outgoing edges to nodes with high degree (i.e., number of connections) in the graph, then the transformation of the Linked Data graph has to concentrate on the removal of edges from low-degree nodes in the computed bindings.

In step 115, a determination is first made as to whether all the bindings $B_i$ for all query patterns i have been processed and/or removed leaving an empty set of computed bindings $B_i$. If at 115, it is determined that no computed bindings $B_i$ remain to be removed from the set RDF R*, then the process terminates at 125, FIG. 1 where a (sanitized) linked data (RDF) graph R' results, i.e., the resulting RDF graph R'=R*. That is, an output RDF graph R' may be generated at 125, FIG. 1 as a result of performing a sanitization process performed in such a way that: No results generated by any query patterns s* can be generated from R'; and R' is produced in a way that optimizes utility function F.

Otherwise, referring back to step 115, for any binding(s) $B_i$ for patterns(s) i that have not yet been processed, the process proceeds to 128 where the actual nodes/links from bindings $B_i$ are removed from the graph. In this step, given R*, actual selected links/nodes are removed from the graph to prevent the disclosure of sensitive patterns in a way that optimizes the specified utility function F. That is, for each identified way (path) in which the sensitive pattern(s) can be discovered in the graph (i.e., those patterns belonging to sensitive patterns of answer set S) the paths that led to generation of these patterns (i.e., bindings—revealing sensitive patterns) are removed from the graph at 128—such as by eliminating an intermediate node in the path or intermediate link in the graph.

That is, at 128, the method selects a number of nodes/links Rr in B (called victim nodes/links), so as to maximize the utility function F, where Rr is the different paths that can lead to producing a sensitive pattern. For example, if bindings exist then the method changes the minimum number of edges/nodes in R* so that bindings break. Given R*, the method includes removing the links/nodes that prevent disclosure of sensitive patterns by optimizing utility function F. Thus, at 135 there is generated the resulting RDF graph R'=R*−Rr. Then the method returns to step 108 in which further sensitive inferences may be discovered.

That is, the process 100 of FIG. 1 is iterated, i.e., these steps are repeated so that all sensitive patterns are concealed. That is, after modifying the RDF as R', the process returns at 145 to the RDF Graph materialization step 108 so that the process steps 108-135 are iteratively repeated until no bindings remain, i.e., all sensitive patterns are concealed. That is, after removing the links or nodes, the inferences are recomputed at 108 to still determine if sensitive patterns S can be produced. This process of removing selected nodes/links from the graph and performing materialization are repeated until no bindings remain to be processed at step 115.

Once the method iterations are performed to remove the ability of attackers to query and obtain sensitive patterns, at this point, the system output is a sanitized linked data graph R', where the sanitization process is performed in a way that: No results generated by query patterns s* can be generated from R'; and R' is produced in a way that optimizes F (utility function).

In an alternative embodiment, at step 112, FIG. 1 there may be computed the bindings for the queries resulting in sensitive patterns S, identified from a prior step. In this method, computer implemented steps are performed to compute any aggregate or value needed by the input cost function F. This, for example, may include computing an intersection of bindings of input query patterns (to enable suppressing less nodes/edges than if each binding is treated independently), or the average betweeness centrality of the input RDF graph. The intersection of bindings can be computed based on the common nodes and/or edges in the corresponding paths. Betweeness centrality is a measure of a node's centrality in a network, measuring the number of shortest paths from all vertices to all other vertices that pass through that node. The average betweeness centrality is the average of the betweeness centralities for the different nodes in the graph. Then, for each query pattern P in S, the bindings are computed.

For every binding $B_i$, a selected node/link yielding $B_i$ is removed, and thus a new graph $R_i^*$ is obtained in which binding $B_i$ does no longer exist. Then, the method computes $F_i=F(R_i^*)$, which captures the utility loss in the graph caused by the removal of the corresponding node/link (e.g., using any aggregate or value computed in the previous step). The same process is repeated for the alternative nodes/links that can be removed to facilitate the hiding of the sensitive pattern. Then, the node/link whose removal yields the minimum loss to the utlity of the graph is selected and is removed from R* (i.e., $F_i=\min\{F_1, \ldots F_i, \ldots\}$). Then, letting Rr be the graph formed by all nodes and edges computed in the iterative steps 104 and 108 (i.e., the graph containing all the information obtained by dereferencing URIs and computing inferences), R* is computed as R*−Rr. The same process continues until all bindings are not discoverable from R*, at which time all sensitive patterns are effectively concealed from the graph.

In one embodiment, the above-mentioned utility function F provides the best selection indication for the most optimal way to remove the bindings, i.e., which edges or nodes, or combinations thereof, to remove from the graph R*. In one embodiment, the method supports a utility function F1, for causing a minimal effect of the hiding process to the non-sensitive inferences (i.e., non-sensitive inferences drawn from R can also be drawn from R'; inferences that cannot be drawn from R cannot be drawn from R').

Alternately, or in addition, the method supports a utility function F2, for preserving incoming/outgoing edges to nodes with high centrality in the graph. There are different measures of centrality that can be supported, such as degree centrality, betweeness centrality, closeness, and eigenvector centrality. As an example, degree centrality captures the number of links that are incident upon a node. Nodes with high degree centrality in a graph are those that have many incoming/outgoing edges. Utility function F2 allows preserving the centrality of such nodes by selecting nodes/edges to remove that are not incident to high centrality nodes.

Alternately, or in addition, the method supports a utility function F3, for suppressing the least number of links from R.

Alternately, or in addition, the method supports a utility function F4, for suppressing the least number of links that are not in the intersection of queries in S.

Figure 2:
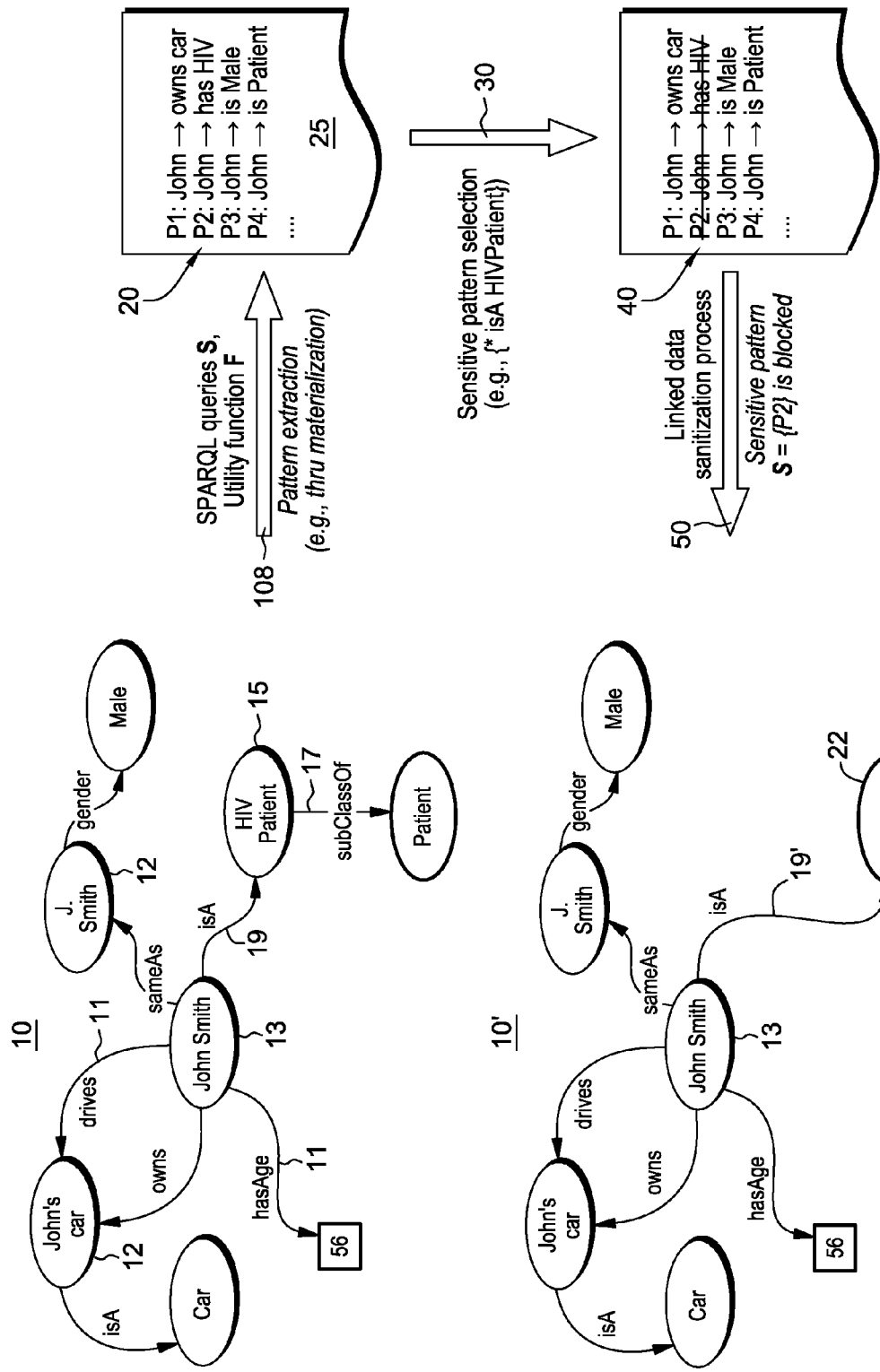
FIG. 2 shows an example implementation in the context of a portion of an example RDF graph having nodes 12 representing example sensitive subject matter of a fictitious entity.

FIG. 2 shows an example implementation in the context of a portion of an example RDF graph 10 having nodes 12 representing a fictitious entity (e.g., an individual "John") and properties represented by edges 11 interconnecting the nodes with other nodes representing classes/attribute values for this individual. Generally, Linked Data graphs consist of multiple classes of entities, each having different properties, and relationships carry semantic labels (e.g., "same as", "subset of", "is a", etc.).

For the example RDF graph 10 depicted in FIG. 2, at least one node 13 includes data for the subject node that may be deemed sensitive, i.e., node 13 has an isA relationship property 19 to node 15 labeled HIV patient. This just happens to be pattern P2 20 indicated as a sensitive pattern. In an example embodiment, all patterns 25 are extracted that could be mined from the graph—i.e., through inferences obtained via a materialization performed on the graph 10 via SPARQL queries. Then, the data owner can select the query patterns S (among all patterns 25) that are considered to be sensitive, as described herein with respect to FIG. 1.

In the example of FIG. 2, computing inferences (e.g. via materialization 108) results in patterns 25 labeled as patterns P1-P4 that are detected/revealed. Each pattern is a particular portion of an original RDF graph having interconnected node (s) and edge(s). For example, in FIG. 2, Pattern P1 represents a graph pattern that John owns a car; Pattern P2 represents a graph pattern that John has HIV; Pattern P3 is a graph pattern representing that John is male; and Pattern P4 is a graph pattern representing that John is a patient.

Figure 6:
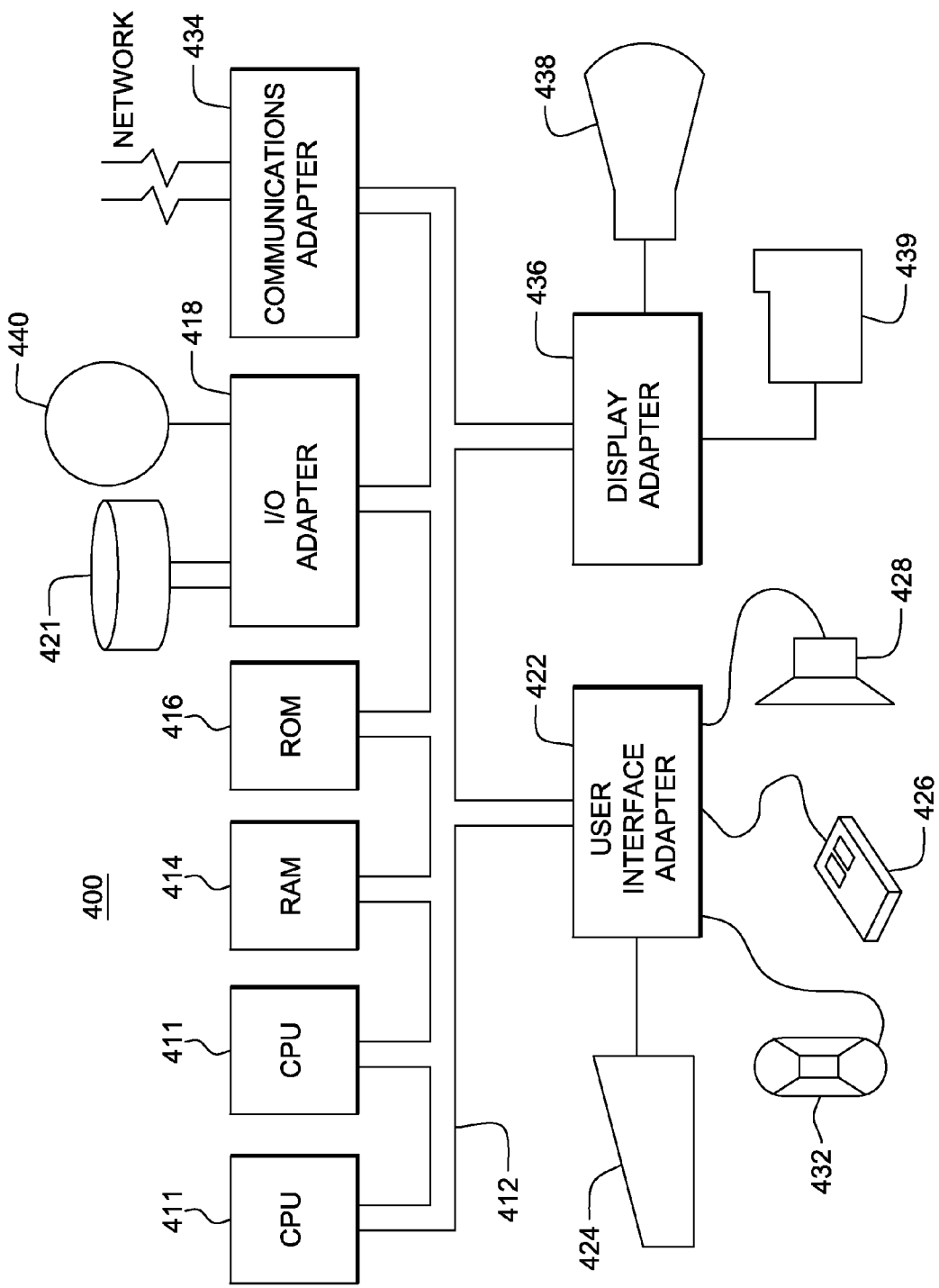
FIG. 6 illustrates a portion of a computer system, including a CPU and a conventional memory in which the present invention may be embodied.

In one embodiment, S patterns may be specified by the user as being sensitive. In the example of FIG. 2, after computing inferences (e.g. via materialization), queries associated with computed patterns P1-P4 could be selected/used to obtain answer sets to these queries that could reveal the sensitive patterns. For example, using sensitive pattern selection query 30 of an example form: *isA HIVPatient, answering the corresponding SPARQL query would find/reveal all people that have HIV—and a portion of the RDF indicating John at node 13, in this example, would be revealed. Thus, one of the patterns in S, i.e., 40, is a result of a query associated with a graph containing information that includes the sensitive information, e.g., John has HIV. Generally, in the context of Linked Data graphs, a query from a given set S of SPARQL query language queries, is used to specify a graph-based condition(s) that is(are) matched against content in the RDF graph. That is, the query graph pattern has conditions that constrain portion of the graph that is specified by the query and is used to extract a graph pattern that is matched on the graph to discover patterns. The computer system 400 of FIG. 6 is programmed to traverse the graph and look at all nodes of the graph and determines if the node is an instance of a subclass as defined in some vocabulary. For example, the system looks at the nodes and determines if there is a match with "HIV" as specified.

Once it is known what is sensitive, the original RDF graph 10 needs to be transformed via use of a utility function F (to transform the original RDF graph) to avoid the sensitive patterns from being extracted. Thus, as shown in FIG. 2, the system at 50 generates a new RDF graph 10' which is as similar as possible to the original linked Data Graph 10; however, sensitive patterns could not be discoverable or extracted. That is, in one embodiment, after first blocking such sensitive inferences, a counterpart RDF graph of the original linked data graph is generated that can be safely published (shared) with untrusted third parties, while maintaining high utility. In the example of FIG. 2, responsive to determining this graph portion having sensitive information about John at node 15, a utility function—of the type such as F1-F4, is processed to remove this sensitive node. The original link 17 between node 15 and node 22 is removed as is node 15 removed. Via altering the RDF representation, according to the implemented function, the isA link 19 is now extended as link 19' to reach patient node 22. In such graph, results of queries S resulting in graphs of this pattern will be empty. A post-processing method enforced after the removal of nodes/links (such as 17 and 15) from the original graph to facilitate the hiding of the sensitive patterns, can be used to restore links in the graph (such as 19') in order to improve utility and to avoid leaving the graph disconnected.

FIG. 2 is illustrative of the example process responsive to input-specification of queries and a transformation utility function. A programmer will know what queries to enter/choose that automatically correspond to or lead to discovery of sensitive patterns. Based on that—the system automatically transforms the original graph to produce a sanitized graph maximizing a utility function to ensure retaining utility and high visibility for its intended purpose yet avoids (blocks) sensitive inferences.

From the context of knowledge hiding, in alternate embodiments, the data owner can specify sensitive patterns based on: a priori knowledge of what type of patterns should not be discovered; e.g., through experience a supermarket owner knows that in her supermarket a set of products sell together frequently which, however, is not common knowledge; she/he can select to protect these patterns when sharing the data.

Further, additional steps including data mining for frequent/interesting patterns may be performed prior, and then a selection (among them) of the sensitive ones performed by a user or automatically. Summarization techniques may also be used and using methods herein; e.g., the supermarket owner mines her data (materializes the graph) and from the identified patterns, selects the ones that are sensitive.

Further, a selection of sensitive patterns may be based upon what is allowed to be discovered: e.g., if the data are to be used for a specific purpose, then the data owner can decide to enable only specific inferences to be drawn—e.g., the supermarket owner enables a manufacturer to identify which other products are sold together with that manufacturer's products, but nothing else. This way, the data owner needs to know only the patterns A that are allowable. Following FIG. 2 at 108, materialization can be performed to reveal all patterns P that can be discovered from Linked Data graph 10. Then, the set of sensitive patterns S=P−A can be used to conceal all the remaining patterns from graph 10, leading to graph 10' where only patterns in A are discoverable.

One example implementation is provided with an example dataset from social care and health care domains having very sensitive information. The goal is to prevent disclosure of information related to some path of data which a patient might have some concern.

For the example implementation, a graph pattern may be specified which when run on a configured computer, will return all information about all lab tests. FIG. 3A depicts application and results 200 of applying a query to a dataset in a particular domain, e.g., healthcare. An example SPARQL query portion 210 is shown specifying instructions and defining example variables 220, including variables for individuals or persons ?x, labtests ?t, a label of a graph edge ?p, and a node ?n to which the edge with a label ?p points. Running graph pattern portion 222 in this example of FIG. 3A will find from the graph for all persons ?x an equivalent person ?y having associated (linked) information about the test (test information) ?t, and from the information finding all edges ?p that points to some node ?n. Running this query 210, the system may extract for all patients, all information of all lab tests in the graph which may include a resulting graph portion 230 encompassing over 1100 nodes and over 8800 interconnecting edges.

Figure 3B:
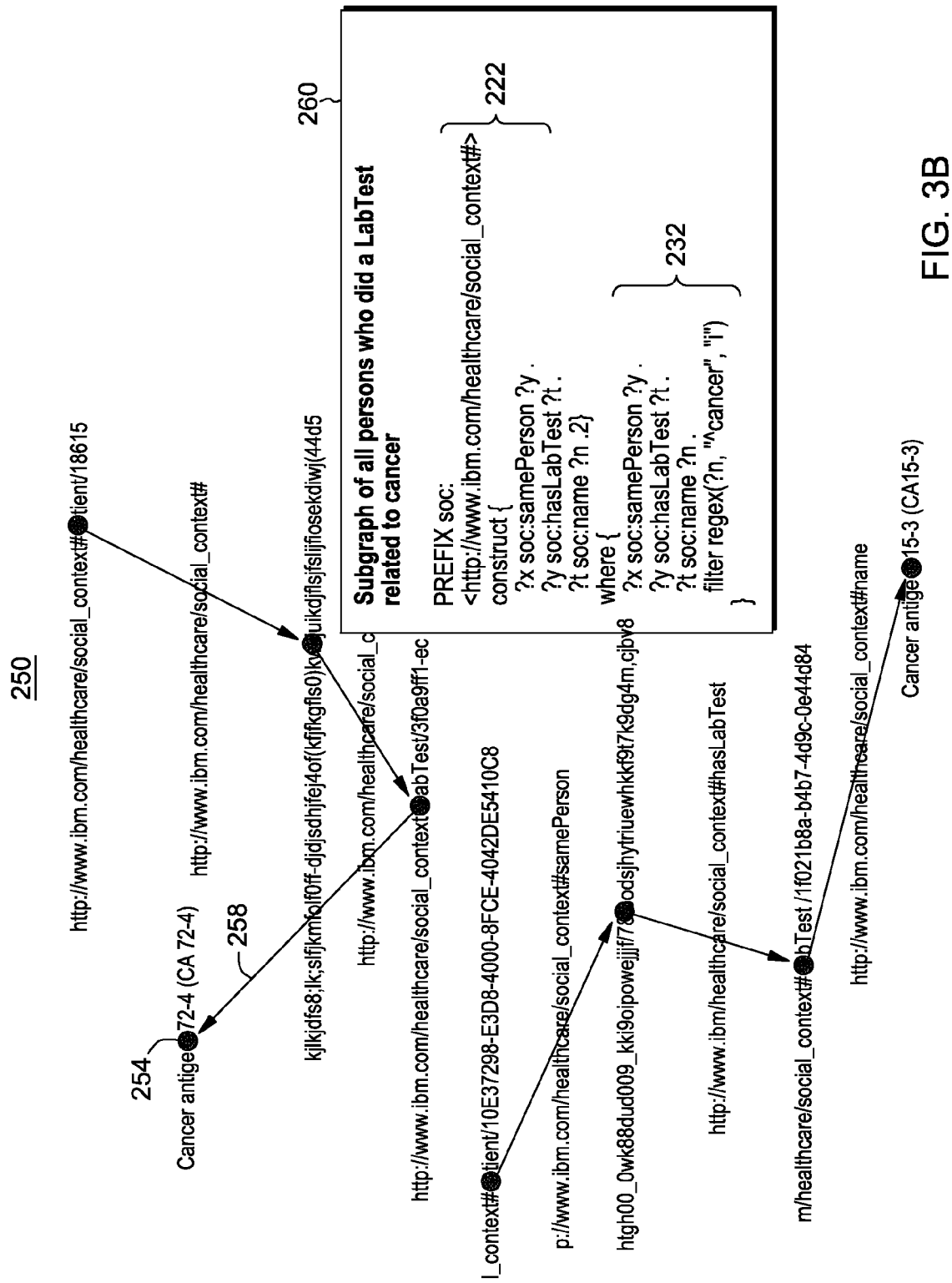
FIG. 3B, shows a resulting graph portion.

Then, in FIG. 3B, shows a resulting graph portion 250 resulting from an example query 260 similar to the query 210 of FIG. 3A, however, with construct 222 modified to implement an additional condition, in the form of a filter. The graph pattern portion 232 implements instruction functioning to filter the test laboratory name ?n to see if it includes the text string 'cancer', i.e., determining a pattern for patients having desired lab tests relating to a specific value such as cancer test. This modified query 260 results in extracting RDF graph pattern portion 250 shown having eight nodes 254 and corresponding six edges 258 as an example use of obtaining only those lab tests relating to cancer information. Thus, specifying a sensitive graph pattern with query and filter condition (for matching a regular expression), a user will be able to retrieve these results which would be undesirable.

Figure 3C:
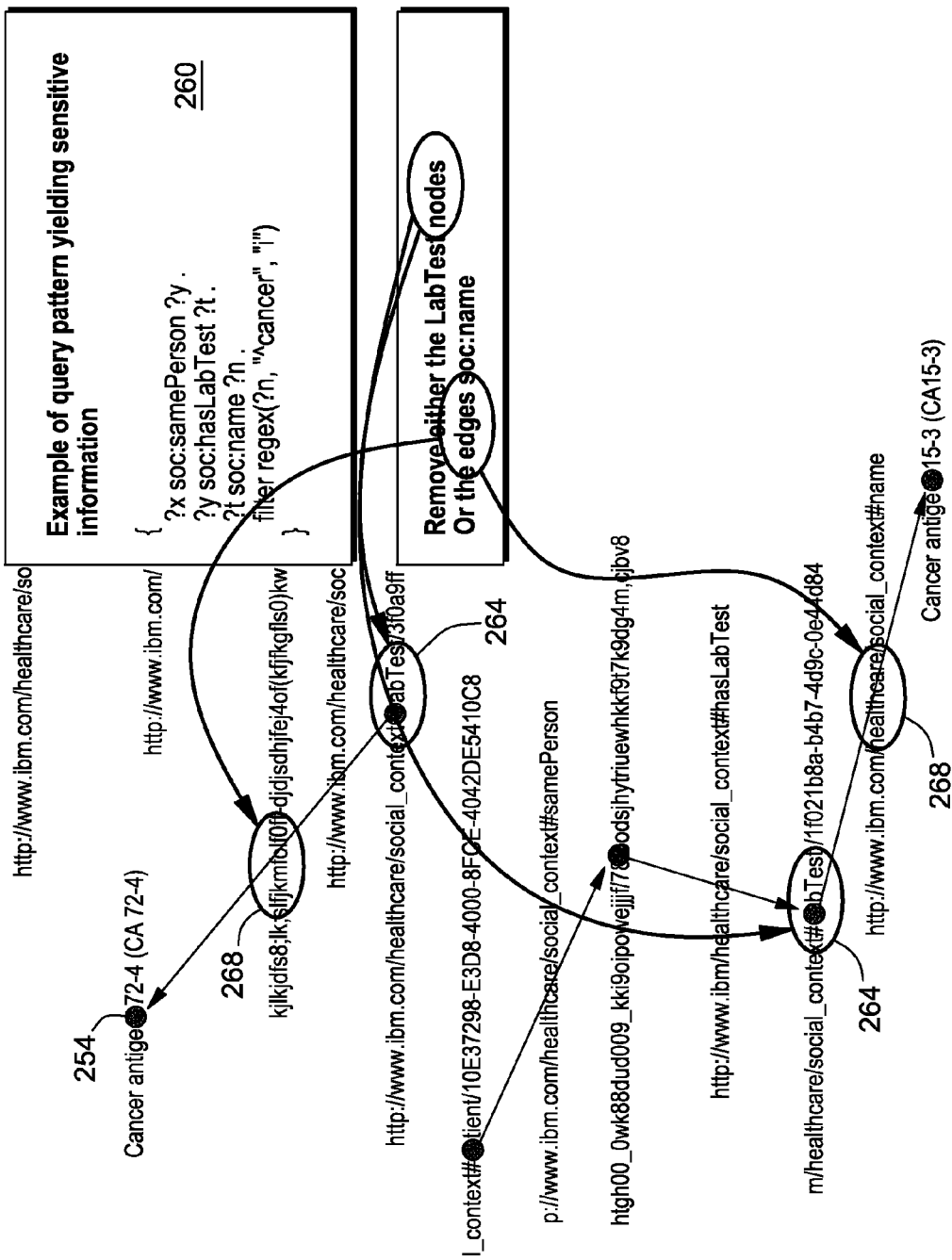
FIG. 3C illustrates nodes or edge removal pursuant to a utility function implemented to conceal a sensitive pattern.

To prevent this, as shown in FIG. 3C, once the sensitive patterns in graph are identified, the nodes may be removed by marked as nodes 264; alternately, or in addition, pursuant to the utility function implemented, some of the edges 268 in the graph may be removed to conceal the pattern. By removing the node, a higher utility function of the graph may be preserved (e.g., this person will be known as having a lab test performed however without knowledge of the outcome). By losing the edges 268 (e.g., according to a utility function), a lower utility graph results in that it may no longer able to be discovered that a particular user had a lab test at all.

Figure 4:
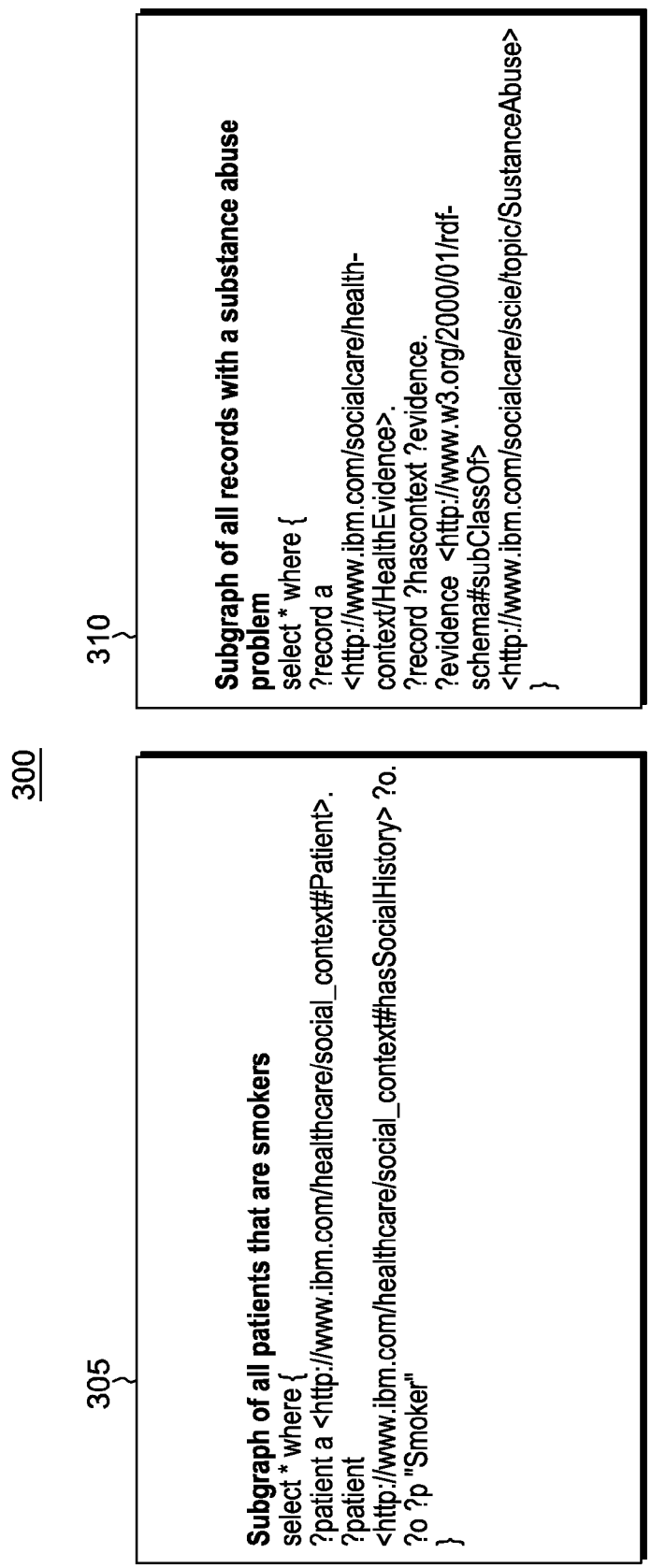
FIG. 4 shows example SPARQL code portions 300 implemented for use in determining sensitive patterns when sanitizing RDF datasets.

FIG. 4 shows example SPARQL code portions 300 implemented for use in determining sensitive patterns when sanitizing RDF datasets. In FIG. 4, queries 305, 310 may be specified to discover and ultimately prevent disclosure of records having sensitive subject matter, e.g., example persons (patients) having substance abuse problems. A graph pattern 310 points to an example substance abuse criteria or value (?evidence) is subclass of substance abuse. In this example, all links with substance abuse may not be acceptable from a privacy perspective. Further query 305 there will be extracted sensitive information including those patients having a social history as a predicate to string "smoker", e.g. (patient is a smoker or is somehow associated with the term "smoking"). In a compressed version of the graph, this evidence may be pruned depending upon the utility function being implemented. That is, for each query pattern P in S which belong to the sensitive patterns answer set, these patterns need to be eliminated. The paths that lead to generation of these patterns are the bindings. So it is discoverable that these patterns can be generated from the graph. Generally, the method determines if such bindings exist, and if so, then, the minimum number of edges/nodes in R* is removed so that those bindings break (are eliminated).

Figure 5:
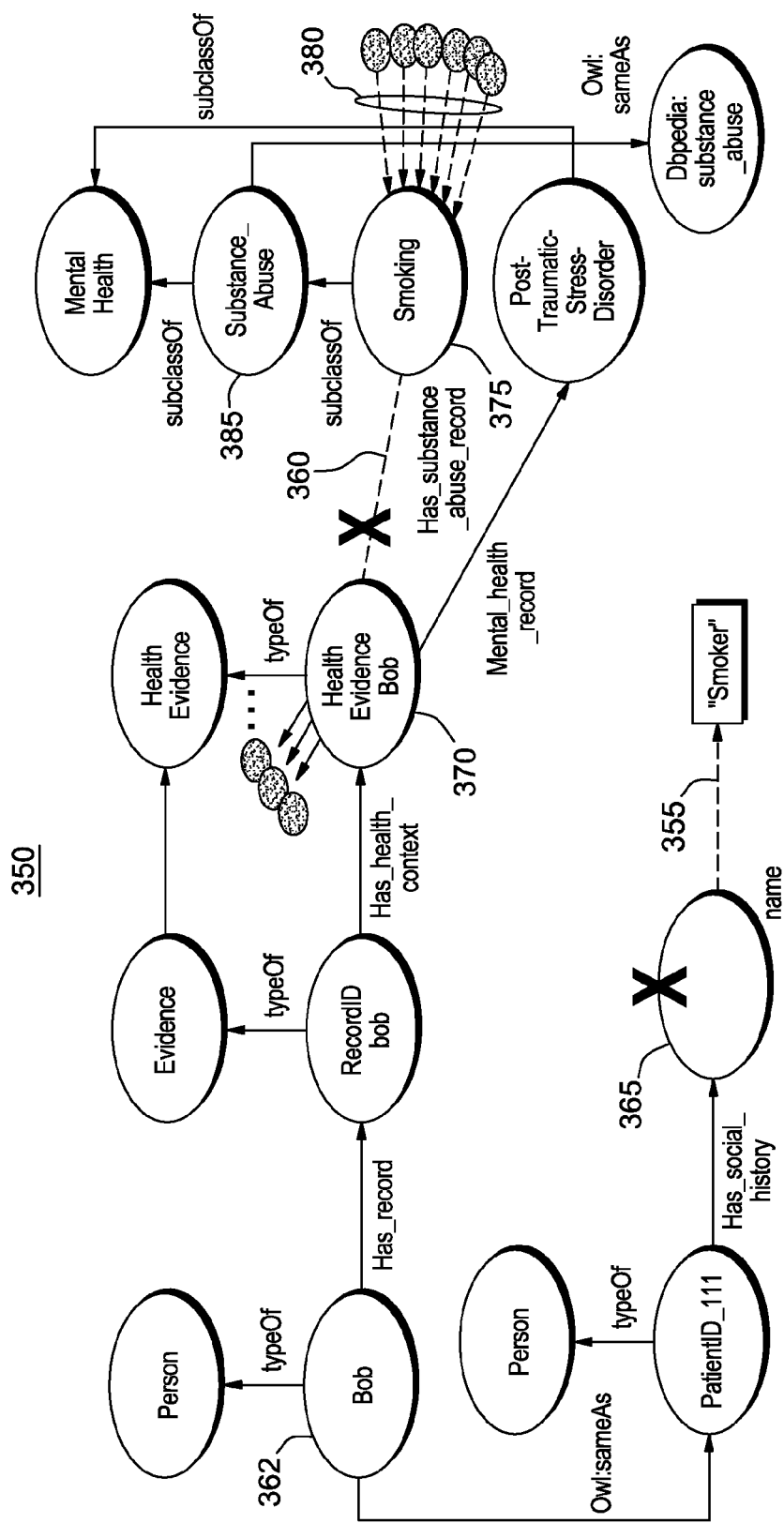
FIG. 5 shows an example extracted Linked Data graph showing potential ways in which the sensitive information is concealed according to a utility function.

FIG. 5 shows an example extracted graph showing potential ways in which the sensitive information is concealed according to a utility function that may be input to the system. The example RDF data graph portion graph 350 shown depicts the breaking of the bindings according to sensitive patterns such as found based on queries 305, 310 of FIG. 4.

In the example shown in FIG. 5, after determining sensitive patterns, the resulting graph shows removing a link 355 that will result in the graph suppressing smoker information but retain the fact that patient has some social history (without the history revealing anything about the patient Bob). Further, the graph shows an example of suppressing node 365 and in effect the entire social history of the patient. In the substance abuse part, there is health evidence for a person Bob, and is connected with substance abuse of some record of type smoking which is a subclass of substance abuse. FIG. 5 is illustrative of a further attempt to remove edge connection shown as broken link 360 "has substance abuse record" connecting "health evidence of Bob" (at node 370) and the "smoking" (at node 375). That is, for an example query, the edge 360 that connects a person evidence record to any of the instances of substance abuse (e.g., smoking, alcohol abuse, drug abuse) may be removed.

Alternately, for an example query, all nodes from the graph labeled as "Smoker" may be removed. That is, as shown in FIG. 5, the "smoking" node 375 may be removed or retained. For example, in one embodiment, instead of removing the node "smoking", all links named "has_substance-_abuse_record" that link "smoking" to health evidences for other people in the system are removed (e.g., links 380 link smoking to health evidences for other people to be protected besides person "Bob"). Other information about the smoking class (not linked to people records) may be retained. In this example the utility function will keep the schema node "smoking" and remove all the links "has_substance_abuse" (while keeping all other smoking information not linked to people intact). It is noted that additionally shown in the example graph 350, the removing class of substance abuse at node 385 would render the graph and the database essentially useless by rendering it with very low utility.

Thus, for the example queries in the context of the example RDF graph 350 of FIG. 5:

If the <Smoking subClassOfSubstanceAbuse> triple is removed, it may be devastating for the knowledge base, since it would also remove answers for several queries that could, e.g., retrieve general information about substance abuse.

A good function F would give higher importance to such triples. For example, in one implementation, this edge could have higher centrality in the graph, a function that would take centrality (or a localized variant of centrality) would yield better results.

Another good example of a function F would give high scores to all schema triples (as defined by RDFS/OWL vocabularies). For example, Smoking (subject) is a subclass of (predicate) Substance_abuse (object). By reference to "score" is meant the value of the utility function. In one embodiment, this is made as high as possible.

A function F that may not work very well in this example would be the one that would give a same score to each edge. With such a function, removing the aforemention triple would yield a better score than removing all the <*, has_substance-_abuse_record, *> triples.

Further the subsets of the graph binded by the queries do not intersect—a common link—a node "Bob" 362 therefore is available to ensure a maximum utility.

After breaking bindings, in accordance with the modified RDF graph portion of FIG. 5, the following SPARQL queries will not result in the disclosure of the concealed information:

?x a Person. ?person <owl:sameAs> ?patient. ?patient has-_social_history ?o. ?o ?p ?v Answers: { }. In this case, the only node that would bind ?o is removed 365.

?record a <Evidence>. ?record ?prop ?evidence. ?evidence ?prop ?value. OPTIONAL {?value <subClassOf> <MentalHealth>} Answers: [Bob—Post-Traumatic-Stress-Disorder]. Only the allowed result for Post-traumatic stress disorder will be returned as the edge in 360, that would make an additional binding for ?evidence ?prop ?value, has been removed.

?bob has record ?record. ?record ?hascontext ?evidence. ?evidence ?prop ?value. value <owl:sameAs> <dbp:substance_abuse> Answers: { } *. Edge in 360 has been removed, which is necessary to bind ?evidence ?prop ?value.

The system and methods herein are adapted to many types of linked data graphs (RDF) nodes for many applications in enterprise space where preserving privacy is a critical task.

The methods and system can be used in conjunction with schemes that may further guarantee anonymity (such as k-anonymity or l-diversity variants), e.g., by changing the original values of a computed set of properties (QI) in the Linked Data graph based on the output of an anonymization (e.g., suppressing or masking) algorithm. Such schemes implemented may include methods disclosed in commonly-owned, co-pending U.S. patent application Ser. No. 13/870,346 entitled GUARANTEEING ANONYMITY OF LINKED DATA GRAPHS the content and disclosure of which is wholly incorporated by reference as if fully set forth herein.

FIG. 6 illustrates one embodiment of an exemplary hardware configuration of a computing system 400 programmed to perform the method steps described herein with respect to FIGS. 1, 2 and 5. The hardware configuration preferably has at least one processor or central processing unit (CPU) 411. The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communication adapter 434 for connecting the system 400 to a data processing network, the Internet, an Intranet, a local area network (LAN), etc., and a display adapter 436 for connecting the bus 412 to a display device 438 and/or printer 439 (e.g., a digital printer of the like).

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While there has been shown and described what is considered to be preferred embodiments of the invention, it will, of course, be understood that various modifications and changes in form or detail could readily be made without departing from the spirit of the invention. It is therefore intended that the scope of the invention not be limited to the exact forms described and illustrated, but should be construed to cover all modifications that may fall within the scope of the appended claims.

The invention claimed is:

1. A method to conceal sensitive patterns from Linked Data Graphs comprising:
   receiving at a hardware processor, data representing a Linked Data graph form (data graph G) and a set of patterns S to be concealed in said data graph G;
   using the hardware processor to de-reference from the received data Uniform Resource Indicators (URIs) in the data graph G;
   using the hardware processor to compute inferences from the de-referenced data graph G structure;
   using the hardware processor to extract said patterns from said data graph G based on said computed inferences;
   using the hardware processor to compute for each pattern extracted its bindings
   in data graph G which lead to the discovery of the patterns S; and
   using said hardware processor to remove each of the one or more bindings in the data graph G by suppressing one or more of: nodes, links between nodes, or nodes and links between nodes to form a new data graph G' such that the patterns discoverable in G, cannot be discovered in graph G', and
   using said hardware processor to render said new data graph G' in a form suitable for publishing over a communications network and accessible via a browser-based user device.

2. The method of claim 1, wherein said one or more bindings are removed in a manner to optimize a given utility function.

3. The method of claim 2, wherein the and
   suppressing one or more of: nodes/links between nodes from the graph G is based on said given utility function.

4. The method of claim 3, further comprising:
iteratively repeating said de-referencing, inferences computing and said node/link suppressing until all the patterns in said set S are non-discoverable in said new Linked Data graph G'.

5. The method of claim 3, wherein said de-referencing URIs in the Linked Data graph G and computing inferences are repeated for up to r times.

6. The method of claim 1, wherein said patterns are based upon one of: a priori knowledge of a user and data mining for patterns in graph G as specified by a user.

7. The method of claim 2, wherein said patterns are represented as queries whose answers yield the patterns, one or more said queries representing patterns not to be concealed in said graph being answerable in said new Linked Data graph G' with a maximal utility based on the utility function.

8. A system for concealing sensitive patterns from Linked Data Graphs comprising:
a memory storage device;
a hardware processor programmed with instructions from said memory storage device to configure said hardware processor to:
receive data representing a Linked Data graph form (data graph G);
receive data representing a set of patterns to be concealed in said data graph G;
de-reference from the received data Uniform Resource Indicators (URIs) in the data graph G;
compute inferences from the de-referenced data graph G structure;
extract said patterns from said data graph G based on said computed inferences;
compute for each pattern extracted its bindings
in data graph G which lead to the discovery of the patterns; and
remove each of the one or more bindings in the data graph G by suppressing one or more of: nodes, links between nodes, or nodes and links between nodes to form a new data graph G' such that said patterns discoverable in G, cannot be discovered in graph G', and
render said new data graph G' in a form suitable for publishing over a communications network and accessible via a browser-based user device.

9. The system of claim 8, wherein said hardware processor is further configured to:
remove the bindings in a manner to optimize a given utility function.

10. The system of claim 9, wherein said hardware processor is further configured to:
suppress one or more of: nodes/links from the graph based on said given utility function.

11. The system of claim 10, wherein the URI de-referencing, inferences computing and said node/link suppressing are iteratively repeated until all the patterns in set S are non-discoverable in said new Linked Data graph G'.

12. The system of claim 11, wherein said de-referencing URIs in the Linked Data graph G and computing inferences are repeated for up to r times.

13. The system of claim 8, wherein said patterns are based upon one of: a priori knowledge of a user and data mining for patterns in graph G as specified by a user.

14. The system of claim 8, wherein said patterns are represented as queries whose answers yield the patterns, one or more said queries representing patterns not to be concealed in said graph being answerable in said new Linked Data graph G', with a maximal utility based on the given utility function.

15. A computer program product to conceal sensitive patterns from Linked Data Graphs comprising:
a storage medium, wherein said storage medium is not a propagating signal, said storage medium readable by a processing circuit and storing instructions for execution by the processing circuit for performing a method comprising:
receiving data representing a Linked Data graph form (data graph G);
receiving data representing a set of patterns to be concealed in said data graph G,
de-referencing from the received data Uniform Resource Indicators (URIs) in the data graph G;
computing inferences from the de-referenced data graph G structure;
extracting said patterns from said data graph G based on said computed inferences;
computing for each pattern extracted its bindings
in data graph G which lead to the discovery of the patterns;
removing each of the one or more bindings in the said data graph G by suppressing one or more of: nodes, links between nodes, or nodes and links between nodes to form a new data graph G' such that said sensitive patterns discoverable in G, cannot be discovered in graph G', and
rendering said new data graph G' in a form suitable for publishing over a communications network and accessible via a browser-based user device.

16. The computer program product of claim 15, wherein the one or more bindings are removed in a manner to optimize a given utility function.

17. The computer program product of claim 16, wherein said
suppressing one or more of: nodes/links from the graph is based on said utility function.

18. The computer program product of claim 17, further comprising:
iteratively repeating said de-referencing, inferences computing and said node/link suppressing until all the patterns in said set S are non-discoverable in said new Linked Data graph G'.

19. The computer program product of claim 17, wherein said de-referencing URIs in the Linked Data graph G and computing inferences are repeated for up to r times.

20. The computer program product of claim 15, wherein said patterns are represented as queries whose answers yield the patterns, one or more said queries representing patterns not to be concealed in said graph of queries being answerable in said new Linked Data graph G' with a maximal utility based on the given utility function.

* * * * *